(12) United States Patent
Mutha et al.

(10) Patent No.: US 10,715,523 B2
(45) Date of Patent: Jul. 14, 2020

(54) DEFAULT TO SIGNED-IN STATE

(71) Applicant: Microsoft Technology Licensing, LLC, Redmond, WA (US)

(72) Inventors: Akshay Mutha, Sammamish, WA (US); Namit Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/722,372

(22) Filed: Oct. 2, 2017

(65) Prior Publication Data

US 2019/0075111 A1 Mar. 7, 2019

Related U.S. Application Data

(60) Provisional application No. 62/555,258, filed on Sep. 7, 2017.

(51) Int. Cl.
*H04L 29/06* (2006.01)
*H04L 29/08* (2006.01)
(Continued)

(52) U.S. Cl.
CPC .......... *H04L 63/0884* (2013.01); *G06F 21/31* (2013.01); *G06F 21/41* (2013.01);
(Continued)

(58) Field of Classification Search
CPC ............ H04L 63/0884; H04L 63/0815; H04L 67/141; H04L 63/18; H04L 63/102; G06F 21/41; G06F 21/62; G06F 21/31
See application file for complete search history.

(56) References Cited

U.S. PATENT DOCUMENTS 7,610,390 B2 * 10/2009 Yared .................... G06F 21/41
709/227
9,749,331 B1 * 8/2017 Koeten .................. H04L 67/10
(Continued)

FOREIGN PATENT DOCUMENTS

WO 03049000 A1 6/2003

OTHER PUBLICATIONS

"International Search Report and Written Opinion Issued in PCT Application No. PCT/US2018/037968", dated Aug. 13, 2018, 12 Pages.

*Primary Examiner* — Meng Li

(57) ABSTRACT

Non-limiting examples of the present disclosure describe generation of a default signed-in state for subsequent authenticated access to a service. Identity provider data for a service is retrieved from any number of identity providers (e.g. a first identity provider and second identity provider). The first and second identity data is evaluated for generation of a default signed-in state to the service. An evaluation determines that at least one of the first identity data and the second identity data comprises data indicating that a user account is signed-in to the service. Data representing the default signed-in state is generated based on a result of the evaluation. The data representing the default signed-in state comprises a selection of one of the first or second identity data that corresponds with the user account that is signed-in to the service. A representation of the service in the default signed-in state may be surfaced.

20 Claims, 6 Drawing Sheets

(51) Int. Cl.
*G06F 21/31* (2013.01)
*G06F 21/62* (2013.01)
*G06F 21/41* (2013.01)

(52) U.S. Cl.
CPC .......... *G06F 21/62* (2013.01); *H04L 63/0815* (2013.01); *H04L 67/141* (2013.01); *H04L 63/102* (2013.01); *H04L 63/18* (2013.01)

(56) References Cited

U.S. PATENT DOCUMENTS

| | | | |
|---|---|---|---|
| 2012/0144034 A1* | 6/2012 | McCarty | H04L 63/0823 709/225 |
| 2015/0209676 A1* | 7/2015 | Tsuchiya | A63F 13/79 463/29 |
| 2015/0215315 A1* | 7/2015 | Gordon | H04L 63/0884 726/5 |

* cited by examiner

100

200

DEFAULT TO SIGNED-IN STATE

CROSS-REFERENCE TO RELATED APPLICATIONS

This application claims priority to U.S. Provisional Patent Application No. 62/555,258, entitled "DEFAULT TO SIGNED-IN STATE", filed on Sep. 7, 2017, which is incorporated by reference herein in its entirety.

BACKGROUND

When users are signed-in to any of the commercial/consumer web workloads (e.g. Outlook®), and they navigate to a new browser tab to go to a different workload (e.g. Office365®), the workloads do not have a way to pick the right user identity. A typical result lands the user into an unauthenticated experience. Typically, in order to sign-in the user from there would require several redirects which is inefficient from a processing standpoint and also creates a poor user experience.

When dealing with just one IDP, things become fairly simple. A service may redirect to the login link of that one IDP and the logic will kick in to sign the user in. When more than one IDP is involved, a service cannot send the user to just one IDP because the service will not know which user must be signed in. Some current services provide single sign-on (SSO) functionality for user accounts, where a web browser may be configured to pass sign-in data (e.g. a previously created cookie) to the service when a browsing experience changes. However, such services are limited in that they are only configured to work with a single identity provider (IDP).

SUMMARY

Non-limiting examples of the present disclosure describe generation of a default signed-in state for subsequent authenticated access to a service. Examples described herein are configured to generate an exemplary default signed-in state that is utilized to redirect an already signed-in user to an authenticated user experience without requiring a user to re-sign in to an application/service. Further, examples described herein are configured to generate the default signed-in state while accounting for multiple user accounts as well as multiple different identity providers.

In one example, first identity provider data for a service is retrieved from a first identity provider and second identity provider data for the service is retrieved from a second identity provider. Additional identity provider data may be retrieved from additional identity providers. The first and second identity data (and any other identity data obtained) is evaluated for generation of a default signed-in state to the service. An evaluation determines that at least one of the first identity data and the second identity data comprises data indicating that a user account is signed-in to the service. Data representing the default signed-in state is generated based on a result of the evaluation. The data representing the default signed-in state comprises a selection of one of the first identity data and the second identity data that corresponds with the user account that is signed-in to the service. A representation of the service in the default signed-in state may be surfaced. The service utilizes the data representing the default signed-in state to provide an authenticated user experience for the user account without requiring additional login to the service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
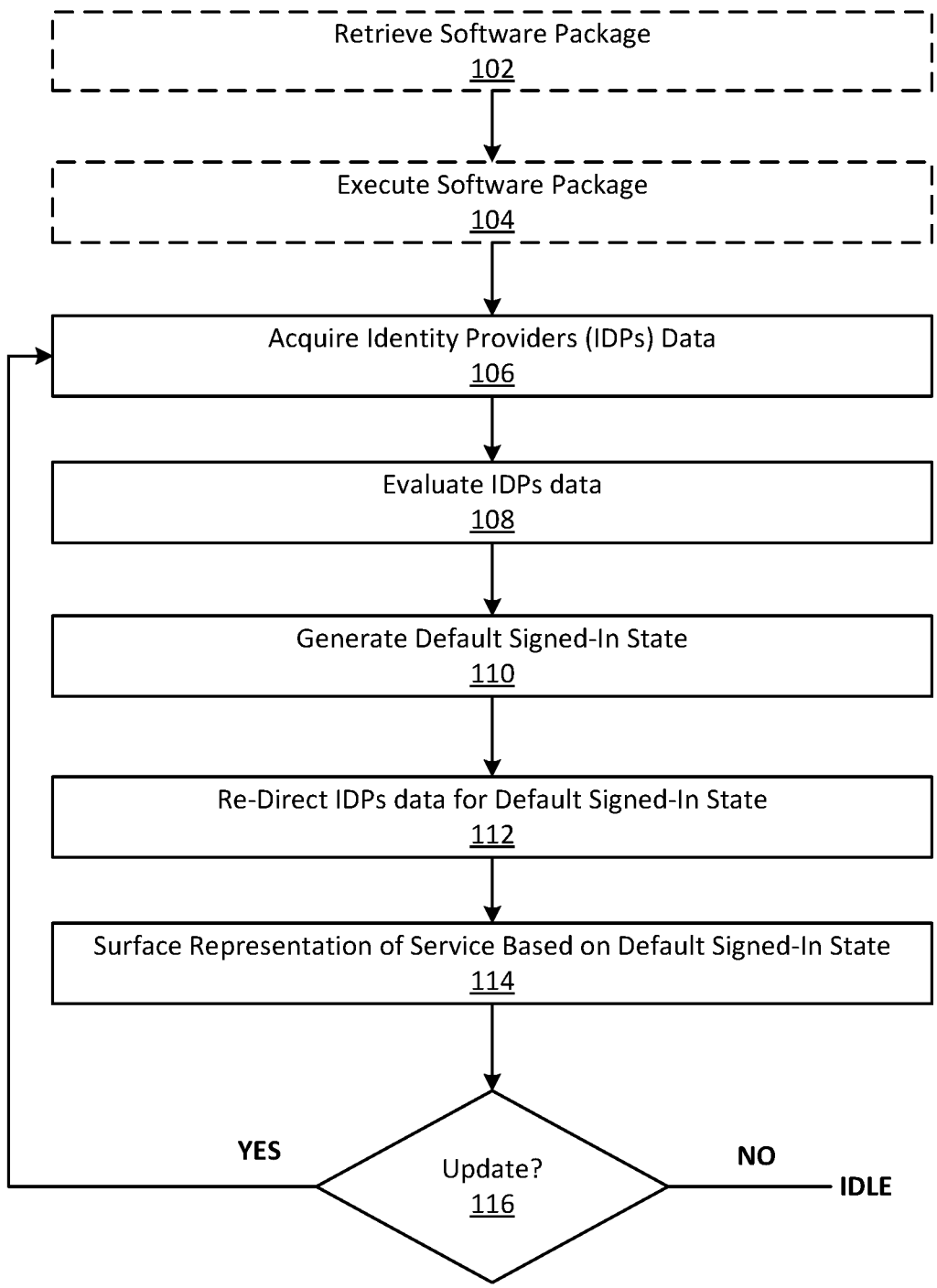
FIG. 1 illustrates an exemplary method related to processing operations for management of an exemplary default sign-in state for a service with which aspects of the present disclosure may be practiced.

Non-limiting examples of the present disclosure describe generation of a default signed-in state for subsequent authenticated access to a service. Examples described herein are configured to generate an exemplary default signed-in state that is utilized to redirect an already signed-in user to an authenticated user experience without requiring the user to re-sign in to an application/service. An exemplary default signed-in state may further account for multiple user accounts as well as multiple different identity providers (IDPs). As an example, an exemplary identity provider (IDP) analysis component may be configured to execute processing operations to: identify signed-in identities for one or more applications/services, choose a default account for generation of a default signed-in state and allow workloads to silently sign-in the users with just one redirection using data representing the default signed-in-state. This not only improves processing efficiency (e.g. for devices associated with an exemplary application/service, computing devices executing web browser applications/services, improving functionality of web browsing services, etc.) but also improves a user experience and user interaction (e.g. user experience) with applications such as web browsing applications and services being accessed via a web browsing application.

Defaulting to a signed-in state on behalf of a user is an important focus to reduce processing load on computing devices and improve user interaction with applications/services including web browsing applications/services. A default signed-in state is beneficial for single sign-on (SSO) instances. As an example, Google® services provide SSO functionality for user accounts but such services are not configured to work with multiple IDPs. That is, Google® may recognize a single IDP that a user is signed into but if there are multiple IDPs (e.g. related to different applications/services and/or different websites), Google® services does not provide functionality to evaluate multiple IDPs (e.g. evaluation of multiple IDPs and determination of a preferred IDP) and re-direct data from multiple IDPs. Different IDPs may have completely different authentication stacks. Thus, multiple re-directions are typically needed to manage IDP data from different IDPs. In the examples described herein, a default signed-in account can be recognized based on user's IDP preference with just one redirection at the end of a flow (e.g. after determination of a default user account is made).

When a website already has cookies for the user to login with, the website may not need to initiate the features described herein. A website may continue to work with the existing cookies. When a website (e.g. Outlook.com) does not have its own cookies for authentication but a counterpart website (example: OneDrive.com) has a user (or users) logged in, then features described herein may be initiated. An exemplary component (e.g. IDP analysis component) may be configured to execute processing operations to analyze IDP data and generate determinations for managing login states of user accounts. An IDP analysis component may be configured to detect login states of user accounts and usage of cookies (e.g. from evaluation of IDP data and/or communication with websites/services), for example, to detect whether a triggering user login data should be passed to a different application/service and/or whether new cookie data should be generated. An exemplary IDP analysis component is configured to retrieve signed in user data (e.g. from a counterpart website/service such as OneDrive.com) through correspondence with one or more IDPs. IDPs are able to provide this data because when services sign in a user, the process drops a cookie for both the IDP and the website/service. Such data may be utilized for analyzing whether to pass existing cookies and/or generate new cookies while respecting security boundaries of websites/services.

In examples described herein, an exemplary IDP analysis component may be configured to generate a new cookie (or cookie data) that accounts for an IDP data evaluation as described herein. Type and format for data included within an exemplary cookie that is generated may vary without departing from the spirit of the invention. Exemplary cookies that are generated and accompany a default sign-in state for a user account, can be utilized to re-validate login data to avoid timeout/logout. Exemplary cookies generated herein may further comprise data that can pass IDP data to multiple different application/services. Cookies generated herein may also be configured to include data for multiple IDPs and/or data related to evaluation of multiple different IDPs that is executed by the web component. This improves processing efficiency of not only exemplary application/services (e.g. reduced latency, streamlining processing including less processing operations transmitted over a network, less resources to manage, etc.) but also computing devices executing the applications/services (e.g. less processing cycles required, more efficient management of resources including memory (e.g. less data that needs to be stored)). Further, this also improves user interaction with computing devices and such exemplary applications/services, where IDP data for multiple IDPs can be managed by a single cookie.

Examples described herein may further extend to evaluation of different IDPs that may be for multiple different users. For example, processing operations described herein may be configured to identify IDPs of different users that may be signed in to different application/services, and execute analysis to automatically generate a default signed-in state for a second browser tab (or instance). Exemplary scenarios may comprise but are not limited to the following few examples:

In one example, a user may be signed into one browser tab with a website with one of the IDPs (e.g. IDP1, IDP2 or IDPN). A different browser tab may be opened to sign in to a different website. In such an instance, an exemplary IDP analysis component is initiated and configured to find signed in IDPs data by reaching out to various IDPs and return that signed in user state to a website.

In another example, a first user is signed in into website #1 with IDP #1 in a first tab. A second user signed in into website #2 with IDP #2. This means multiple users from multiple IDPs are signed in at a time. In such an instance, an exemplary IDP analysis component is initiated and configured to find the signed in IDPs by reaching to the various IDPs and execute evaluation (e.g. computation operations) of data from multiple IDPs. For example, an exemplary IDP analysis component may select signed-in data for one IDP over another based on different parameters (e.g. preferred user, most recently signed in user, etc.). The IDP analysis component may further be configured to return that signed in user state to a website to create a default signed-in user experience.

In yet another example, a first user (User #1) and a second user (User #2) are both are signed-in to the same IDP at the same time. In a browser (or application) someone opens a new browser tab to navigate to a different application/website. In such an instance, an exemplary IDP analysis component is initiated and configured to retrieve the signed-in IDPs by reaching out to various IDPs. The IDP analysis component is configured to locate multiple users signed-in at the same time with the same IDP. In this case, the IDP component may be configured to execute a call to a website to redirect to IDP to surface a user interface (UI) prompt that examples a user to disambiguate between signed-in user accounts (e.g. via a user interface). In alternate examples, instead of re-directing a user to a service, an exemplary browser application may be configured to adapt its UI to surface a UI prompt for disambiguating between different signed-in user accounts.

Moreover, processing examples described herein are not limited to merely web browsing applications/service. Examples described herein are also valid for application+browser scenarios. For instance, a user logs into an operating system with a user account. An exemplary operating system log-in flow may share IDP data with a browser by putting the IDP data in browser cookie jar or shared credential manager. When a user initiates a browser application/service and visits a website, this may initiate an exemplary IDP analysis component that is configured to detect a signed-in user account.

Furthermore, processing efficiency of exemplary applications/services may be improved through the collection of telemetry data. Telemetry data may be collected, aggregated and evaluated, for example, to improve processing efficiency and user interactions based on an analysis of user behaviors with exemplary applications/services. For instance, a telemetry property may be set for all data that is passed, where telemetry data may be collected through data logs. In one example, machine learning modeling (e.g. deep learning) and processing (based on learning data representations) may be implemented and used to evaluate log data to guide suggestions for applications/services for example, for selection of preferred IDPs on behalf of users and/or providing suggestions to users for selection of an IDP, among other examples. Telemetry data may be aggregated and analyzed at different levels (e.g. user level, group level, IDP type, etc.) where data specific to a single user or data specific to a plurality of users may be a basis for future adjustments to processing operations described herein.

FIG. 1 illustrates an exemplary method 100 related to processing operations for management of an exemplary default sign-in state for a service with which aspects of the present disclosure may be practiced. An exemplary default sign-in state is utilized to create an authenticated user experience for execution of an application/service without requiring a user to re-sign in when they are already logged in. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where an exemplary software package is retrieved. An exemplary software package comprises one or more files related to execution of processing operations described herein. Processing operation 102 may be optional in some versions of method 100 as processing operations herein may be already configured to work with specific applications/services without requiring a user or application/service to retrieve (processing operation 102) the software package. The software package for running processing operations described herein may be downloaded specifically through an application/service by a user. In another example, an application/service may be configured to access an exemplary package (e.g. via download) and extract a component (e.g. software module, application, executable file, etc.) for executing processing operations described herein. In yet another example, an exemplary package may be included as an add-on to an existing application/service or configured within a newly created application/service (e.g. new web browsing application/service).

At processing operation 104, the exemplary software package is executed. Processing operation 104 may be optional in some versions of method 100 as processing operations herein may be already configured to work with specific applications/services without requiring a user or application/service to execute (processing operation 104) the software package. Execution (processing operation 104) of an exemplary software package may comprise processing operations for one or more of: parsing the software package, locating one or more files for execution (e.g. JavaScript files), selection of the one or more files and deployment of the one or more files.

In one example, multiple versions of a file (e.g. JavaScript file (JS)) may be included in an exemplary software package. JavaScript is just one example of a file type. Examples described herein may extend to other types of files without departing from the spirit of this disclosure. For instance, one version may be a full version (e.g. full JS file with comments) and another version may be a minified version. Deployment of an exemplary file may comprise processing operations including one or more of: checking in a file (e.g. registering the file with a source depot) and hosting the file (e.g. hosting a file locally, through web hosting using a content delivery network (CDN)).

Flow may proceed to processing operation 106, where IDP data (or IDPs data) is acquired from one or more IDPs. In one example, processing operation 106 may comprise receiving IDP data from one or more IDPs (IDP #1, IDP #2, IDP # N). In an alternated example, processing operation 106 may comprise executing a call made to acquire IDP data from one or more IDPs. In one example, an IDP may correspond specifically with an application/service. In other examples, an IDP may correlate to a plurality of applications/service, for example, in a single-sign on (SSO) instance. IDP data may comprise data indicating whether (or not) a user account is signed into any applications/services, operating systems, etc. that are configured to interface with an exemplary application/service such as a web browsing application/service. An exemplary web browsing application/service may be utilized to access data over a network connection. Further, IDP data may include any other data related to authentication (including timestamp data for an active login of a user) of a user account and may be continuously updated by an IDP and/or data received from an application/service. For instance, a user account may be logged out after a period of inactivity, sign-out action by a user, etc., where IDP data may reflect a current state of a user account.

Triggers for receiving/requesting IDP data may vary. In one example, IDP data may be requested periodically at various time intervals (e.g. 1 min, 3 min, 5 min, etc.). In another example, IDP data may be requested when a new browser window or tab is launched. In yet another example, IDP data may be requested when a user is accessing a specific application/service that is configured to interface with an exemplary web browsing service. For example, a user may be accessing a service providing a suite of productivity applications (e.g. Microsoft® Office365®), where processing operations described herein are executed as background processing while a user is accessing a service. In another instance, user input into a web browsing service or web search service may be a trigger for request for IDP data. In other examples, communication with an IDP may alert the IDP to provide IPD data when any changes to IDP data (e.g. identified by an IDP) occur (e.g. user account is signed-out). In alternative examples, triggers for receiving/requesting IDP data may depend on a signed-in state for applications/services. For instance, processing operations may detect that a user was previously signed into a user account associated with an application/service and has since logged out. In such an instance, new IDP data may be requested when a user attempts to sign back in to that application/service or a different application/service.

IDPs may separately managed IDP data, where one or more authentication stacks may be associated with an IDP to manage IDP data. An exemplary component for evaluating IDP data (e.g. IDP analysis component, IDP data analysis component) may retrieve IDP data from multiple different IDPs, analyze the IDP data and generate a default signed-in state for a user account. In one example, IDP data may comprise an indication of whether a user account is registered in a signed-in state with a specific application/service. For instance, a signed-in state of a user account may correspond with any of: a user account of a service, a user account associated with an application, a user account associated with a specific computing device of a user (or in other cases multiple computing device e.g. multimodal communications), among other examples. An exemplary web browsing application/service may be configured to interface with an exemplary component for managing IDP data, that may initiate communications with IDPs, manage a default signed-in state, communication with an application/service, etc. Applications/services may include any applications/services including applications/services that are under the same platform (e.g. Microsoft®, Google®, Apple®, etc.) as well as applications/services across different platforms (including third-party application/services).

Processing operation 106 may comprise operations that load data into a web component (e.g. an inline Frame (IFrame), which is used to retrieves data from other sources such as applications/services that are interfacing with an exemplary web browser application/service. For example, an executed file (e.g. from the software package) may retrieve IDP data from application/services via an exemplary IFrame running in conjunction with a web browsing application/service. An IFrame is an example of a web component that is used to run a script to retrieve IDP data from different sources. An IFrame is an HTML document embedded inside another HTML document on a website. The IFrame HTML element is usable to insert content from another source into a web page. For example, a script may be run that calls an application programming interface (API) that may request and receive IDP data from different applications/services, where the IFrame is an access point for initiating such a call. It is to be understood that an IFrame is just one example of a web component that may be used to retrieve IDP data from different sources. Examples described herein may extend to other types of web components without departing from the spirit of this disclosure.

In one example, a single IFrame may correspond with a link that requests IDP data for a single IDP. However, examples herein are not so limited. In another example, an IFrame may correspond with multiple links for request of IDP data. In such an instance, links for IDPs may have to be in sequential order. In yet another example, multiple IFrames may be configured to access and retrieve IDP data (e.g. from different applications/services). Exemplary web components (e.g. IFrame) may execute processing operations in a manner that is hidden from view of a user.

Processing operation 106 may further comprise operations that retrieve the IDP data from specific IDPs, for example, execution of a call to different IDPs to get sign-in state details from specific IDPs. In one example, processing operation 106 may comprise operations for creation and transmission of a configuration-options object, which is a data object that is passed to (or redirected to an IDP) to get sign-in state information from applications/services. An exemplary configuration-options object may comprise data comprising but not limited to: a request for data pertaining to configuration information for specific IDPs, parameters for identification of preferred types of IDPs, parameters for indicating console messages (e.g. that can be utilized for debugging purposes), application-specific fields or parameters and telemetry properties, among other examples.

Exemplary IDPs may return sign-in state details in response to an exemplary call operation, for example, in a callback response. In one example, a response may yield a data array or object (e.g. JSON object). An exemplary response from IDP may comprise data including but not limited to: indication of whether a request for IDP data was redirected to an application/service (or indication of transmission error), IDP data for default signed-in user account/accounts, user identifier for signed-in user account (e.g. email address or login username), login hints (e.g. parameters to help identify specific user accounts, profile data associated with signed-in account, etc.), application-specific properties, indication of a preferred IDP and telemetry properties, among other examples. As indicated above, an exemplary application/service may have a preference for an IDP based on the nature of the application/service, user settings, etc. As an application/service may be configured to work with multiple IDPs and processing operations herein evaluate multiple IDPs, an application/service may set a preference for specific identity provider (IDP). An exemplary component for managing a default signed-in state manages such data and communication with IDPs and applications/services including acquisition of data necessary to execute operations described herein. For example, an application/service may be geared for usage in a professional setting (e.g. work/business collaboration) and set a preference for a business IDP of a user. In another instance, an application/service may be more consumer friendly, for example, a social networking service, that may set a preference for a consumer IDP of a user. In alternate examples, a user may set an IDP preference for an application to recognize.

IDP data, received from exemplary IDPs, may be evaluated processing operation 108. Processing operations related to processing operation 108 may be executed by one or more web components such as an IDP analysis component (or IDP data analysis component). As indicated above, an exemplary web component may manage communications with IDPs, applications/service (including a web browsing application/service), creation and update of a default signed-in state, among other examples. An exemplary web component is configured to create, maintain, and manage identity information for principals (e.g. users) and provides principal authentication to other service providers within a federation, such as with web browser profiles. An exemplary web component is further configured to be an intermediary component for web services, for example, creating web coherence for exemplary applications/services. The web component may be configured to resolve issues that cause friction with a service that may be associated with a plurality of domains. For example, a service for a suite of productivity, applications (e.g. Microsoft® Office365®) may be managing SSO data among web properties, where the web component is configured to create a default to signed-in state when multiple user identities are available.

Processing operation 108 may comprise operations to parse and analyze IDP data received from the multiple IDPs. The parsed data may be analyzed to evaluate whether a user is signed-in to an IDP or not as well as indicate how many IDPs are authenticated. Processing operation 108 may comprise operations that evaluate data objects returned from specific IDPs. In one example, processing operation 108 may evaluate authentication states provided in the data that is returned from an IDP. Processing operation 108 may further comprise operations select a user identifier for a user account that is needed for defaulting the user to a signed-in state to an application/service. For instance, an exemplary determination made by the web component may be a decision as to which identity to default to a signed-in state for a user account. In at least one example, such a determination may be executed based on data evaluated from applications/services that indicate preference for managing IDP data. An exemplary web component may be configured to set rules for selecting IDP data to redirect and manage the rules for determining IDP data to redirect. In some examples, a machine-learning model may be applied to execute decisions regarding redirection of IDP data (including selection of a preferred IDP).

Processing operation 108 may further comprise operations that evaluate a preference set for a preferred IDP (i.e. is IDP #1 or IDP #2, IDP # N being preferred), for example, where the preference may be an application-specific preference received from an application/service. A web component, executing processing operation 108, may further be configured to execute operations to select a preferred IDP from IDP data (IDPs data) provided by an application/service. For instance, multiple user accounts may be signed in, where a preferred IDP may be selected for generation of a default signed-in state to create an authenticated experience for an application/service.

In one example, a user may be signed into one browser tab with a website with one of the IDPs (e.g. IDP1, IDP2 or IDPN). A different browser tab may be opened to sign in to a different website. In such an instance, an exemplary IDP analysis component is initiated and configured to find signed in IDPs data by reaching out to various IDPs and return that signed in user state to a website.

In another example, a first user is signed in into website #1 with IDP #1 in a first tab. A second user signed in into website #2 with IDP #2. This means multiple users from multiple IDPs are signed in at a time. In such an instance, an exemplary IDP analysis component is initiated and configured to find the signed in IDPs by reaching to the various IDPs and execute evaluation (e.g. computation operations) of data from multiple IDPs. For example, an exemplary IDP analysis component may select signed-in data for one IDP over another based on different parameters (e.g. preferred user, most recently signed in user, etc.). The IDP analysis component may further be configured to return that signed in user state to a website to create a default signed-in user experience.

In yet another example, a first user (User #1) and a second user (User #2) are both are signed-in to the same IDP at the same time. In a browser (or application) someone opens a new browser tab to navigate to a different application/website. In such an instance, an exemplary IDP analysis component is initiated and configured to retrieve the signed-in IDPs by reaching out to various IDPs. The IDP analysis component is configured to locate multiple users signed-in at the same time with the same IDP. In this case, the IDP component may be configured to execute a call to a website to redirect to IDP to surface a user interface (UI) prompt that examples a user to disambiguate between signed-in user accounts (e.g. via a user interface). In alternate examples, instead of re-directing a user to a service, an exemplary browser application may be configured to adapt its UI to surface a UI prompt for disambiguating between different signed-in user accounts. For instance, a user may be signed into both a consumer user account and a business user account, where a UI prompt may be surfaced to the user to enable the user to disambiguate which user account should be utilized for accessing an application/service.

Moreover, processing examples described herein are not limited to merely web browsing applications/service. Examples described herein are also valid for application+browser scenarios. For instance, a user logs into an operating system with a user account. An exemplary operating system log-in flow may share IDP data with a browser by putting the IDP data in browser cookie jar or shared credential manager. When a user initiates a browser application/service and visits a website, this may initiate an exemplary IDP analysis component that is configured to detect a signed-in user account.

A determination as to whether a user identity is identified or not (e.g. when a signed-in state is identified for at least one application/service) may impact a user interface experience (UX) provided by an application/service. For instance, an authenticated user experience or an unauthenticated user experience may be presented. In one example where a logout is detected from a signed-in state, an unauthenticated user experience may be presented.

Processing operation 108 executes operations that evaluate IDP data received from multiple IDPs. While examples herein are configured to evaluate data from multiple IDPs, IDP data received back from IDPs may not always indicate that a user is signed into multiple IDPs. While that is one example, another example may indicate that a user account is signed into one IDP but not another. As identified above, some examples of a determination made in processing operation 108 may yield a decision that there are multiple IDPs for default sign-in to an application/service. In such an instance, an exemplary web component may be configured to provide a UI prompt enabling a user to disambiguate between IDPs that they would like to use for a default signed-in state. As indicated above, exemplary processing may comprise logging and evaluation of telemetry data including deep learning that can adjust operation based on user behaviors and preferences. For instance, if a user has selected a preferred IDP (at previous disambiguation prompts) an exemplary web component can be configured to recognize this and apply this knowledge to enhance subsequent decisions.

Once IDP data has be analyzed and a decision made as to which IDP data is to be used for defaulting to a signed-in state, flow of method 100 proceeds to processing operation 110. At processing operation 110, a default signed-in state for a user is generated. The default signed-in state for the user account may reflect a selected IDP determined from processing operation 108. An exemplary default signed-in state for a user account enables a representation of an application/service in an authenticated state without requiring a user to re-sign into an application/service.

Processing operation 110 may comprise generating, based on a result of an evaluation of IDP data (received from the IDPs), data representing the default signed-in state. The data representing the default signed-in state comprises a selection of one of the first identity data and the second identity data that corresponds with the user account that is signed-in to the service. In one example first identity provider data may indicate that a user account is signed-in to an application/service and second identity provider data indicates that another user account is signed-in to the application/service. In such an instance, the generating of the data representing the default signed-in state may comprises selecting one of the first identity data and the second identity data based on a preference, received from the service, for a user account of a specific identity provider. In another example where multiple user accounts are identified as being signed-in to an application/service, the generating of the data representing the default signed-in state may comprise: surfacing a prompt for a user to select a specific user account from the first identity provider and the second identity provider. A selection of a specific user account may be received, for example, from a surfaced prompt, where data representing the default signed-in state is generated based the selection of the specific user account from the surfaced prompt.

When a website already has cookies for the user to login with, the website may not need to initiate the features described herein. A website may continue to work with the existing cookies. When a website (e.g. Outlook.com) does not have its own cookies for authentication but a counterpart website (example: OneDrive.com) has a user (or users) logged in, then features described herein may be initiated. An exemplary component (e.g. IDP analysis component) may be configured to execute processing operations to analyze IDP data and generate determinations for managing login states of user accounts. An IDP analysis component may be configured to detect login states of user accounts and usage of cookies (e.g. from evaluation of IDP data and/or communication with websites/services), for example, to detect whether a triggering user login data should be passed to a different application/service and/or whether new cookie data should be generated. An exemplary IDP analysis component is configured to retrieve signed in user data (e.g. from a counterpart website/service such as OneDrive.com) through correspondence with one or more IDPs. IDPs are able to provide this data because when services sign in a user, the process drops a cookie for both the IDP and the website/service. Such data may be utilized for analyzing whether to pass existing cookies and/or generate new cookies while respecting security boundaries of websites/services.

In some examples, exemplary web browsing applications/services may be configured to check for a previously generated default sign-in state and whether that previously generated default sign-in state is active before generation of a new default sign-in state. For instance, a predetermined time period may be assigned for an active cookie, which may correspond with authentication settings for an exemplary application/service (e.g. where a user login may remain active for a period of time and/or account for activity/inactivity). If an exemplary cookie is still active, a new browser window or tab may automatically default the application service to a signed-in state for a user. This may enable cross-over between web browsing applications/services that may recognize the generated default sign-in state for a user account.

In processing operation 112, IDP data is redirected to an application/service to create a default sign-in state associated with a user account.

In some examples of method 100 (e.g. client-side computing examples), flow may proceed to processing operation 114, where a representation of an application/service based on the default signed-in state is surfaced, for example, through the web browsing application/service. In doing so, processing operation 114 may comprise creating/generating cookies to support authentication of a user account associated with the default signed-in state. In the present disclosure, processing operation 114 may comprise creating a new cookie based on the selection of one of the first identity data and the second identity data that corresponds with the user account that is signed-in to the service. Exemplary cookies that accompany a default sign-in state for a user account are newer (e.g. creation timestamp and can be used to re-validate login data to avoid timeout/logout). Exemplary cookies generated herein may further comprise data that can pass IDP data to multiple different application/services. Exemplary cookies may also be configured to include data for multiple IDPs and/or data related to evaluation of multiple different IDPs that is executed by the web component. This improves processing efficiency of not only exemplary application/services (e.g. reduced latency, streamlining processing including less processing operations transmitted over a network, less resources to manage, etc.) but also computing devices executing the applications/services (e.g. less processing cycles required, more efficient management of resources including memory (e.g. less data that needs to be stored)). Further, this also improves user interaction with computing devices and such exemplary applications/services.

In other examples (e.g. server-side computing examples), data for generation and display of the default signed-in state may be transmitted to a client computing device for display on a display of a client computing device (or a display connected with a client computing device). In processing operation 114, the service utilizes the data representing the default signed-in state to provide an authenticated user experience for the user account without requiring additional login to the service. In some instance, an application/service is accessed via a web browser, and wherein the surfacing (processing operation 114) provides the representation of the service based on one of: a launch of a new browser window of the web browser and a launch of a new browser tab of the web browser.

Flow may proceed to decision operation 116, where is it determined whether IDP data is to be updated. As described above, triggers for requesting IDP data (update to IDP data) may vary including action initiated triggers such as a user changing a signed-in state for specific IDP data. In examples where an exemplary web browsing application/service is still active, flow of decision operation 116 may branch YES and processing of method 100 may return to processing operation 106, where IDP data is acquired (or re-acquired) from applications/services. In examples where an exemplary web browsing application/service is no longer active or a user has logged out of previously signed-in user accounts, flow of decision operation 116 may branch NO and processing of method 100 remains idle.

In one example, a user may close out of an active web browsing application/service but the web browsing application/service may be configured to remain active in a background processing of a computing device, for example, to preserve a state in the event a user quickly re-initializes the web browsing application/service. In other examples, a previous default signed-in state may be maintained for a predetermined amount of time. As described in previous examples, web browsing applications/service may be configured to check for an active default sign-in state before seeking new IDP data. In at least one example, if a user were to re-initialize a web browsing application/service, an exemplary web component may execute processing operations to recall data related to a default signed-in state, request new IDP data and compare the new IDP data with that of the previous default signed-in state.

Figure 2:
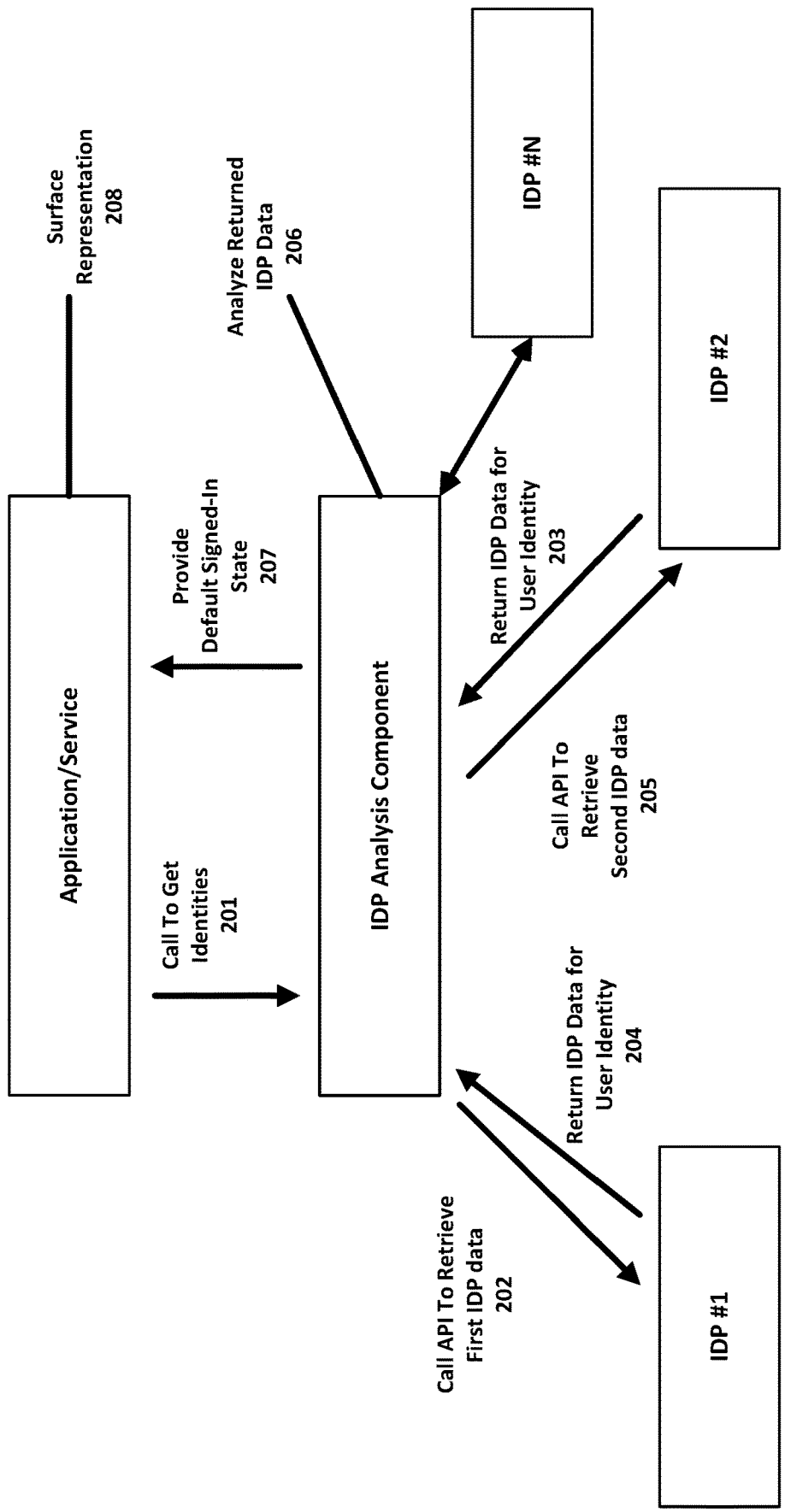
FIG. 2 illustrates an exemplary method related to an interaction between an exemplary application/service, IDPs and an IDP analysis component with which aspects of the present disclosure may be practiced.

FIG. 2 illustrates an exemplary method 200 related to an interaction between an exemplary application/service, IDPs and an IDP analysis component with which aspects of the present disclosure may be practiced. An exemplary IDP analysis component may manage data associated with generation of a default sign-in state and communication with IDPs and applications/services as described herein in at least the description of method 100 (FIG. 1). As an example, method 200 may be executed by an exemplary processing device and/or system such as those shown in FIGS. 3-5. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/ services associated with a web service that has access to a plurality of application/services, devices, knowledge resources, etc. Processing operations described in method 200 may be implemented by one or more components connected over a distributed network.

In method 200, an exemplary application/service may execute a call (processing operation 201) to an IDP analysis component to get identity data (e.g. user identities) of users that are signed-in to the application/service. The IDP analysis component is configured execute calls (processing operation 202 and 203) to different IDPs (e.g. IDP #1 and IDP #2, IDP # N) to retrieve IDP data from specific IDPs. The IDPs respectively provide IDP data (IDPs data) to the IDP analysis component (processing operation 204 and 205).

The IDP analysis component analyzes (processing operation 206) returned IDP data from the multiple IDPs. Analysis of IDP data may yield generated of a default signed-in state (as described in method 100), for example, when it is determined that a user is signed-in to one or more IDPs. In some instances, analysis (processing operation 206) may yield a determination that a user is not signed-in to any IDPs. In such an instance, a default signed-in state is not generated. In those examples, an IDP analysis component may still be configured to provide such data to an application/service, for example, where the application/service can know to provide an un-authenticated user experience for a user.

The IDP analysis component is configured to provide (processing operation 207) a generated default signed-in state to an exemplary application/service. The application/ service is configured to utilize the default signed-in state to surface (processing operation 208) an authenticated representation of the application/service for the user. For instance, the application/service utilizes a cookie (for the default signed-in state) provided by the IDP analysis component to automatically log a user account into the application/service without requiring re-authentication.

Moreover, processing efficiency of an exemplary IDP analysis component may be improved through the collection of telemetry data. Telemetry data may be collected, aggregated and evaluated, for example, to improve processing efficiency and user interactions based on an analysis of user behaviors with exemplary applications/services. A telemetry property may be set for all data that is passed, where telemetry data may be collected through data logs. An IDP analysis component may be configured to collect and evaluate telemetry data to improve decision making processing, for example, based on user behaviors. In one example, machine learning modeling (e.g. deep learning) and processing (based on learning data representations) may be implemented and used to evaluate log data to guide suggestions for analysis of IDP including selection of preferred IDPs on behalf of users and/or providing suggestions to users for selection of an IDP, among other examples. Telemetry data may be aggregated and analyzed at different levels (e.g. user level, group level, IDP type, etc.) where data specific to a single user or data specific to a plurality of users may be a basis for future adjustments to processing operations described herein.

Figure 3:
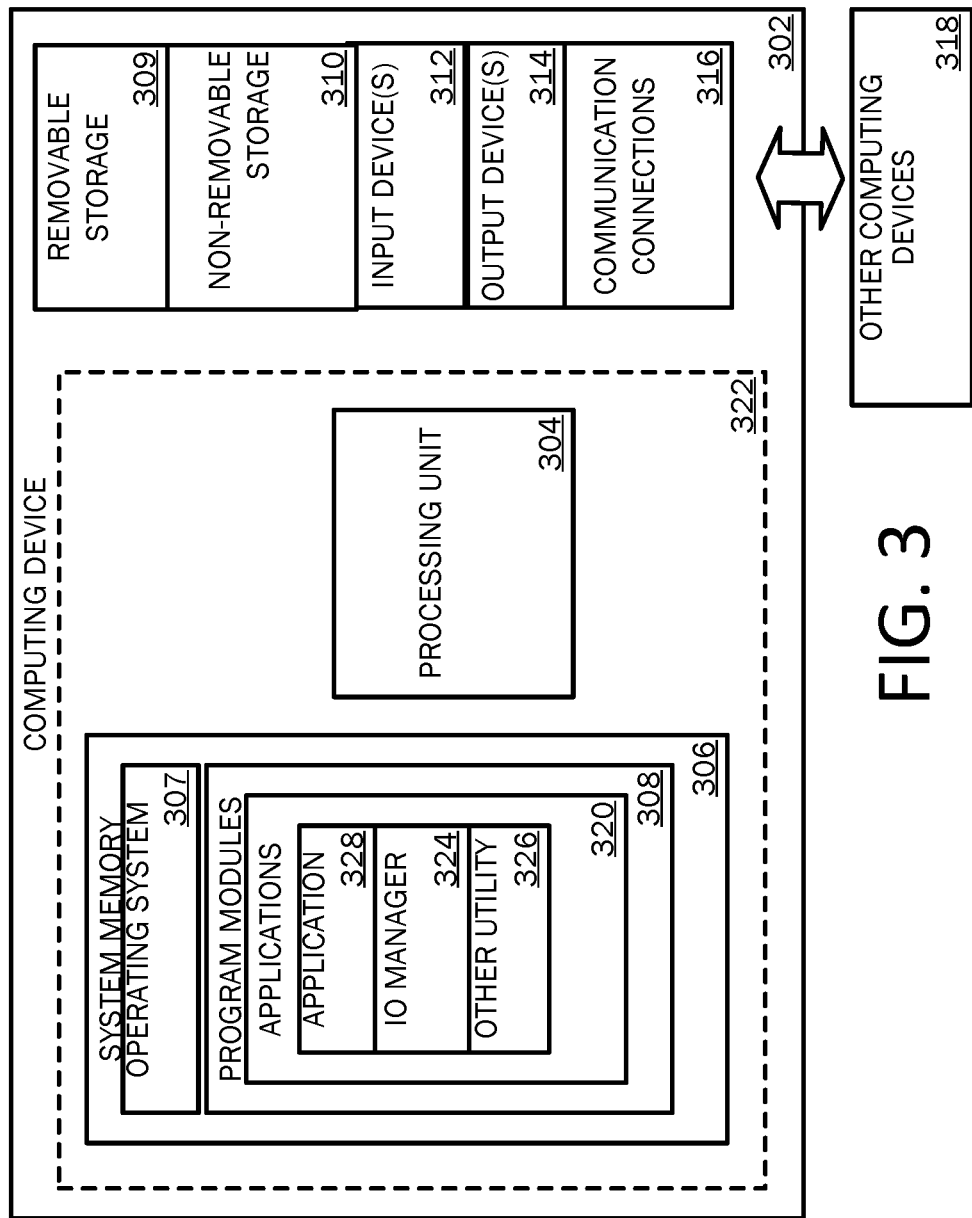
FIG. 3 is a block diagram illustrating an example of a computing device with which aspects of the present disclosure may be practiced.
Figure 4A:
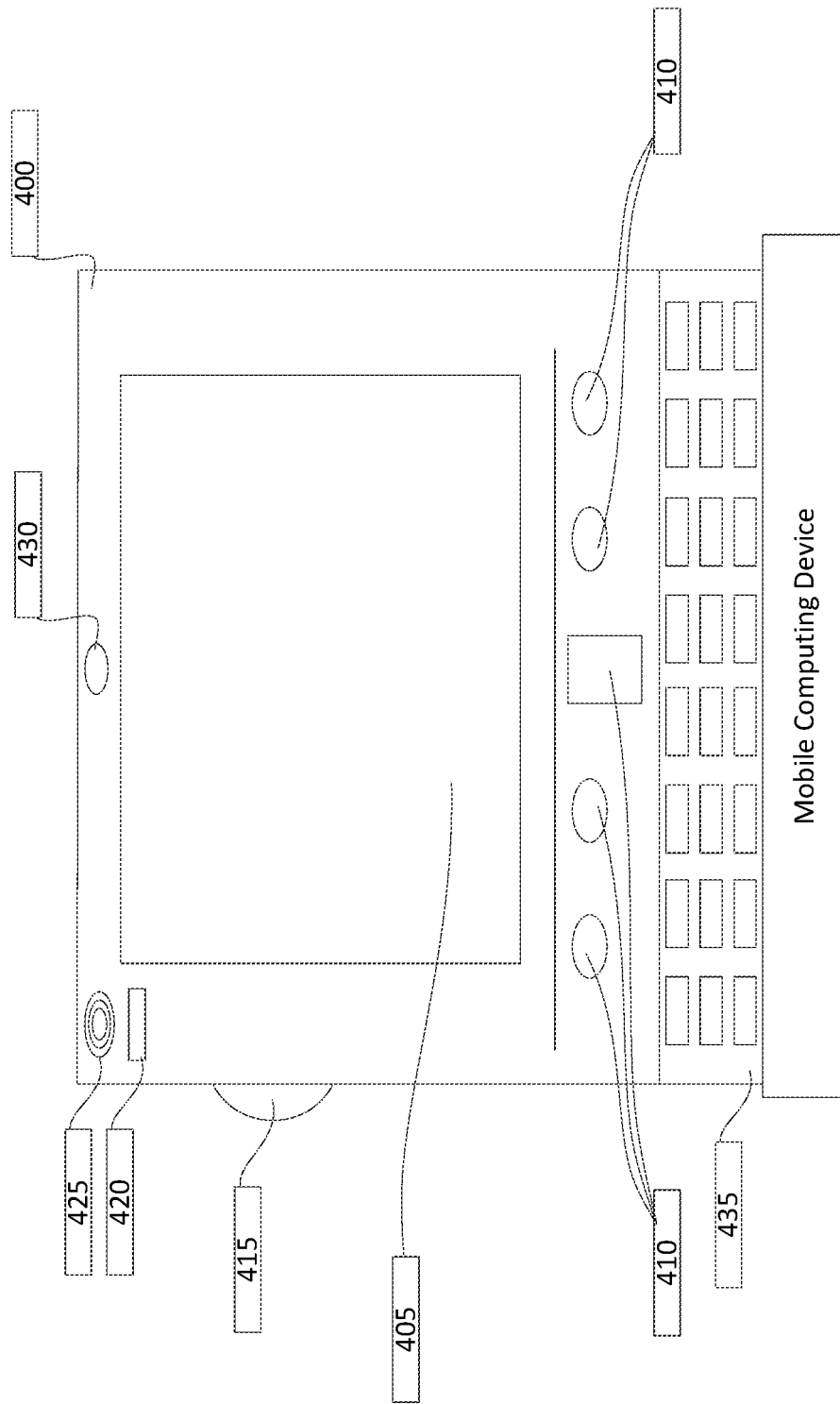
FIGS. 4A and 4B are simplified block diagrams of a mobile computing device with which aspects of the present disclosure may be practiced.
Figure 4B:
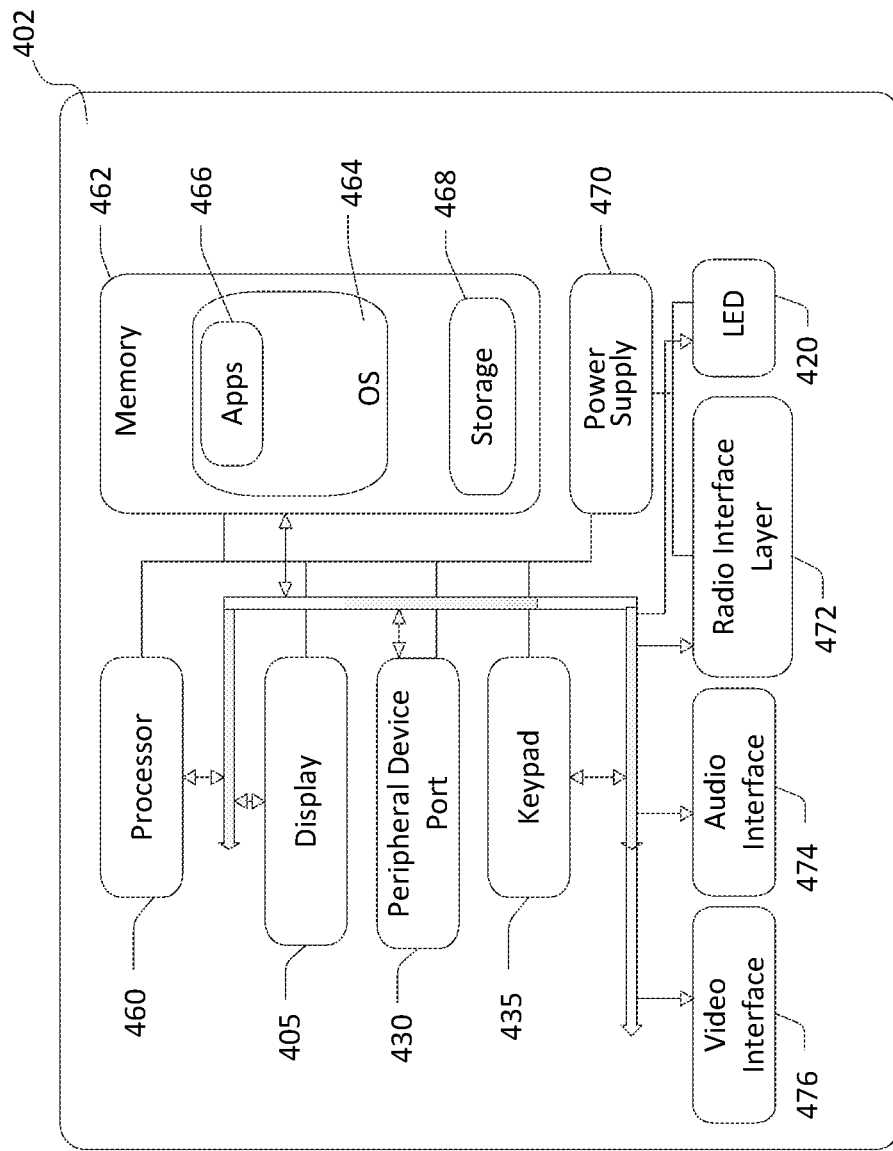
Figure 5:
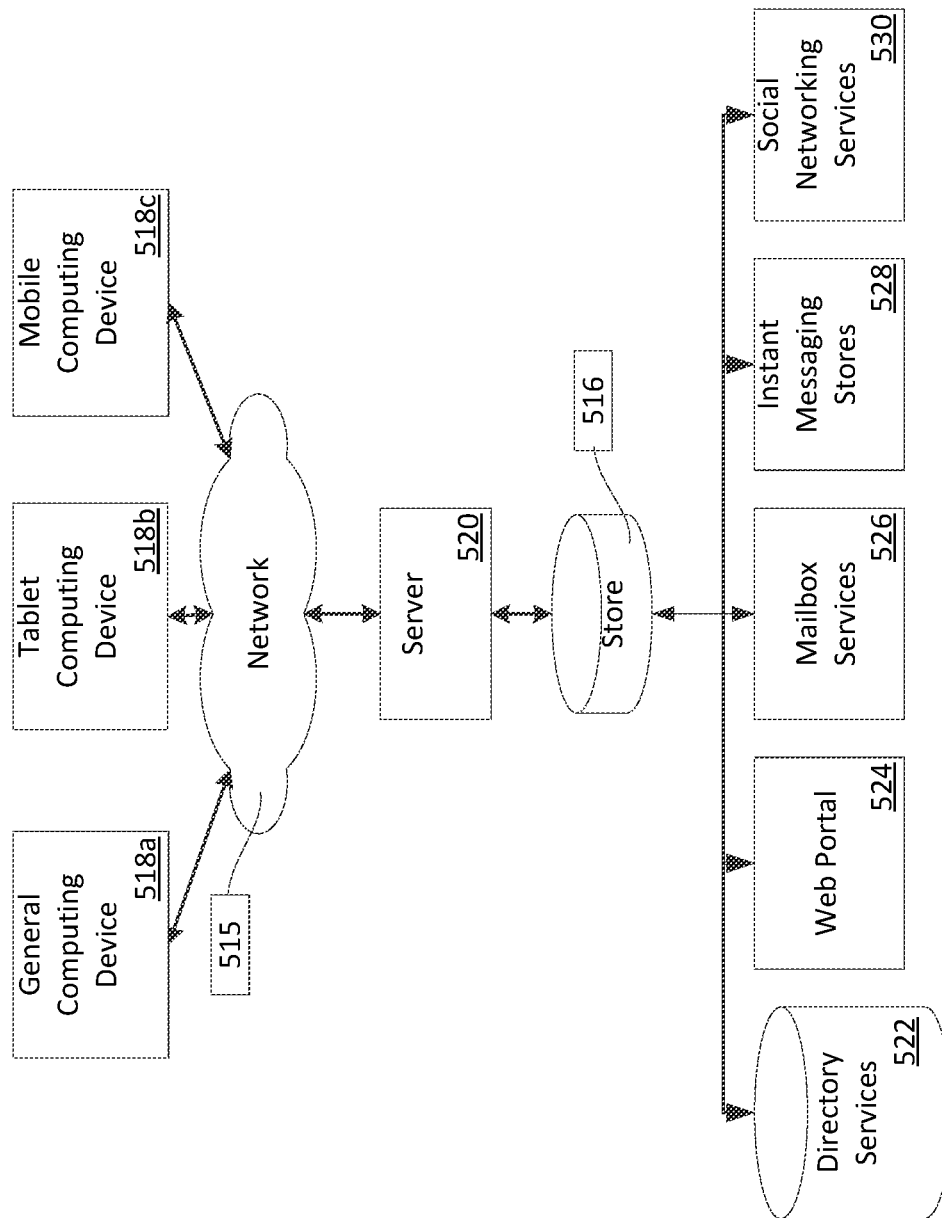
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for management of an exemplary default signed-in state for a service as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for management of an exemplary default signed-in state for a service as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for management of an exemplary default signed-in state for a service described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
retrieving, from a first identity provider, first identity provider data for a service;
retrieving, from a second identity provider that is different from the first identity provider, second identity provider data for the service;
evaluating the first identity data and the second identity data for generation of a default signed-in state to the service, wherein the evaluating determines that the first identity data indicates that a user account is signed-in to the service using a first user account and the second identity data indicates that a second user account is signed-in to the service;
generating, based on a result of the evaluating, data representing the default signed-in state, wherein the data representing the default signed-in state is generated based on application of preference rules for the service that selects one of the first identity data and the second identity data as an identity for the default signed-in state; and
surfacing a representation of the service in the default signed-in state, wherein the service utilizes the data representing the default signed-in state to provide an authenticated user experience for the identity without requiring additional login to the service.

2. The method of claim 1, wherein the service is accessed via a web browser, and wherein the surfacing provides the representation of the service based on one of: a launch of a new browser window of the web browser and a launch of a new browser tab of the web browser.

3. The method of claim 1, wherein the surfacing comprises transmitting the data representing the default signed-in state to the service, and wherein the service is accessed via a web browser.

4. The method of claim 1, wherein the generating of data representing the default signed-in state further comprises: creating a new cookie for authentication of the identity based on a result of the application of the preference rules for the service, and wherein the new cookie is utilized to create the surfaced representation of the service in the default signed-in state.

5. The method of claim 1, wherein the service is part of a suite of software services, and wherein the default signed-in state provides access to services of the suite of software services.

6. The method of claim 1, wherein the user account is a consumer user account and the second user account is a business user account, and wherein the preference rules for the service comprises a preference rule that prioritizes one of the consumer account and the business account over the other.

7. The method of claim 1, further comprising: executing a web component that interfaces with a computing device that is running the service in which the first user account and the second user account are signed-in to, and wherein the web component is configured to executed machine learning processing that is configured to apply the preference rules for the service to select one of the first identity data and the second identity data as the identity for the default signed-in state.

8. A system comprising:
at least one processor; and
a memory, operatively connected with the at least one processor, storing computer-executable instructions that, when executed by the at least one processor, causes the at least one processor to execute a method that comprises:
retrieving, from a first identity provider, first identity provider data for a service;
retrieving, from a second identity provider that is different from the first identity provider, second identity provider data for the service;
evaluating the first identity data and the second identity data for generation of a default signed-in state to the service, wherein the evaluating determines that the first identity data indicates that a user account is signed-in to the service using a first user account and the second identity data indicates that a second user account is signed-in to the service;
generating, based on a result of the evaluating, data representing the default signed-in state, wherein the data representing the default signed-in state is generated based on application of preference rules for the service that selects one of the first identity data and the second identity data as an identity for the default signed-in state; and
surfacing a representation of the service in the default signed-in state, wherein the service utilizes the data representing the default signed-in state to provide an authenticated user experience for the identity without requiring additional login to the service.

9. The system of claim 8, wherein the service is accessed via a web browser, and wherein the surfacing provides the representation of the service based on one of: a launch of a new browser window of the web browser and a launch of a new browser tab of the web browser.

10. The system of claim 8, wherein the surfacing comprises transmitting the data representing the default signed-in state to the service, and wherein the service is accessed via a web browser.

11. The system of claim 8, wherein the generating of data representing the default signed-in state further comprises: creating a new cookie for authentication of the identity based on a result of the application of the preference rules for the service, and wherein the new cookie is utilized to create the surfaced representation of the service in the default signed-in state.

12. The system of claim 8, wherein the service is part of a suite of software services, and wherein the default signed-in state provides access to services of the suite of software services.

13. The system of claim 8, wherein the user account is a consumer user account and the second user account is a business user account, and wherein the preference rules for the service comprises a preference rule that prioritizes one of the consumer account and the business account over the other.

14. The system of claim 8, wherein the method, executed by the at least one processor, further comprises: executing a web component that interfaces with a computing device that is running the service in which the first user account and the second user account are signed-in to, and wherein the web component is configured to executed machine learning processing that is configured to apply the preference rules for the service to select one of the first identity data and the second identity data as the identity for the default signed-in state.

15. A computer-readable medium storing computer-executable instructions that, when executed by at least one processor, causes the at least one processor to execute a method comprising:
    retrieving, from a first identity provider, first identity provider data for a service;
    retrieving, from a second identity provider that is different from the first identity provider, second identity provider data for the service;
    evaluating the first identity data and the second identity data for generation of a default signed-in state to the service, wherein the evaluating determines that the first identity data indicates that a user account is signed-in to the service using a first user account and the second identity data indicates that a second user account is signed-in to the service;
    generating, based on a result of the evaluating, data representing the default signed-in state, wherein the data representing the default signed-in state is generated based on application of preference rules for the service that selects one of the first identity data and the second identity data as an identity for the default signed-in state; and
    transmitting the data representing the default signed-in state to a computing device that is usable for presentation of the default signed-in state for the identity without requiring additional login to the service.

16. The computer-readable medium of claim 15, wherein the service is accessed via a web browser, and wherein the surfacing provides the representation of the service based on one of: a launch of a new browser window of the web browser and a launch of a new browser tab of the web browser.

17. The computer-readable medium of claim 15, wherein the generating of data representing the default signed-in state further comprises: creating a new cookie for authentication of the identity based on a result of the application of the preference rules for the service, and wherein the new cookie is utilized to create the surfaced representation of the service in the default signed-in state.

18. The computer-readable medium of claim 15, wherein the service is part of a suite of software services, and wherein the default signed-in state provides access to services of the suite of software services.

19. The computer-readable medium of claim 15, wherein the user account is a consumer user account and the second user account is a business user account, and wherein the preference rules for the service comprises a preference rule that prioritizes one of the consumer account and the business account over the other.

20. The computer-readable medium of claim 15, wherein the method, executed by the at least one processor, further comprising: executing a web component that interfaces with a computing device that is running the service in which the first user account and the second user account are signed-in to, and wherein the web component is configured to executed machine learning processing that is configured to apply the preference rules for the service to select one of the first identity data and the second identity data as the identity for the default signed-in state.

\* \* \* \* \*